No. 611,151. Patented Sept. 20, 1898.
C. F. SCOTT.
SYSTEM OF ELECTRICAL DISTRIBUTION.
(Application filed Oct. 22, 1897.)

(No Model.) 2 Sheets—Sheet 1.

WITNESSES:
Ethan D. Dodds
H. C. Tener

INVENTOR
Charles F. Scott
BY Wesley G. Carr
ATTORNEY.

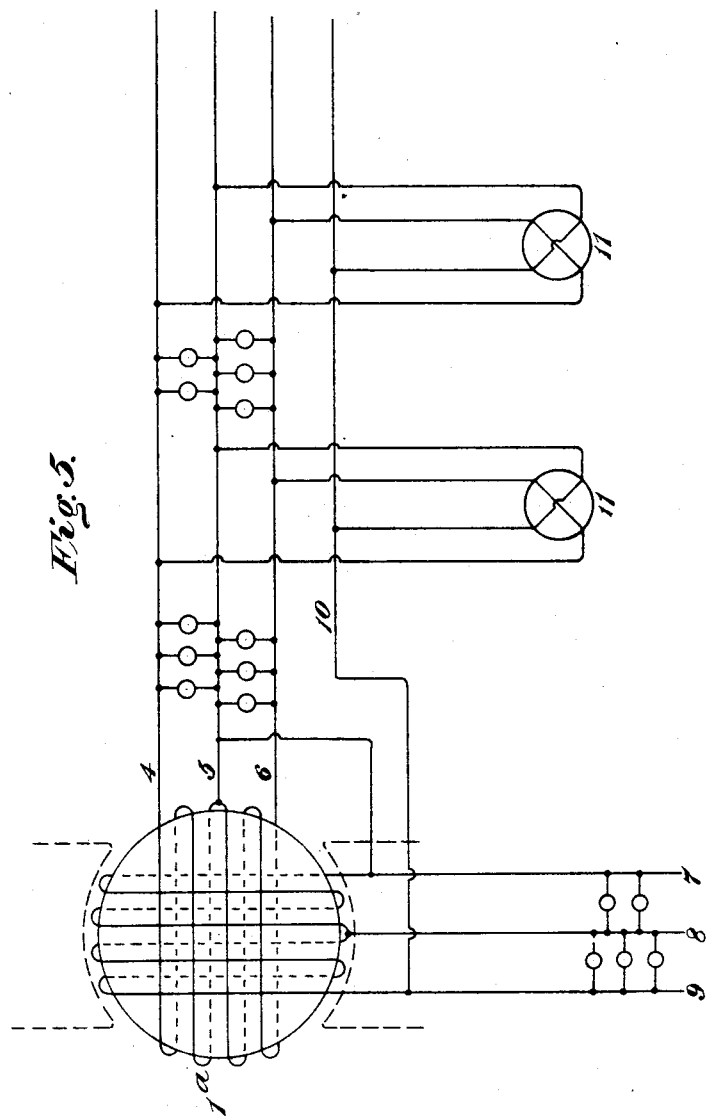

UNITED STATES PATENT OFFICE.

CHARLES F. SCOTT, OF PITTSBURG, PENNSYLVANIA, ASSIGNOR TO THE WESTINGHOUSE ELECTRIC AND MANUFACTURING COMPANY, OF PENNSYLVANIA.

SYSTEM OF ELECTRICAL DISTRIBUTION.

SPECIFICATION forming part of Letters Patent No. 611,151, dated September 20, 1898.

Application filed October 22, 1897. Serial No. 656,002. (No model.)

*To all whom it may concern.*

Be it known that I, CHARLES F. SCOTT, a citizen of the United States, residing in Pittsburg, in the county of Allegheny and State of Pennsylvania, have invented a new and useful Improvement in Systems of Electrical Distribution, (Case No. 757,) of which the following is a specification.

My invention relates to systems of alternating-current electrical distribution, and particularly to such systems as embody two main supply-conductors and a neutral or compensating conductor for supplying translating devices arranged in multiple series.

One object of my invention is to provide a means whereby a single-phase circuit of this character may be readily and inexpensively supplemented by a fourth conductor in such manner as to provide a four-wire two-phase circuit suitable for the operation of two-phase alternating-current motors as well as single-phase translating devices.

A further object of my invention is to provide means whereby a plurality of three-wire out-of-phase circuits may be so combined and supplemented that either or both may be utilized for the operation of polyphase motors.

Figure 1:
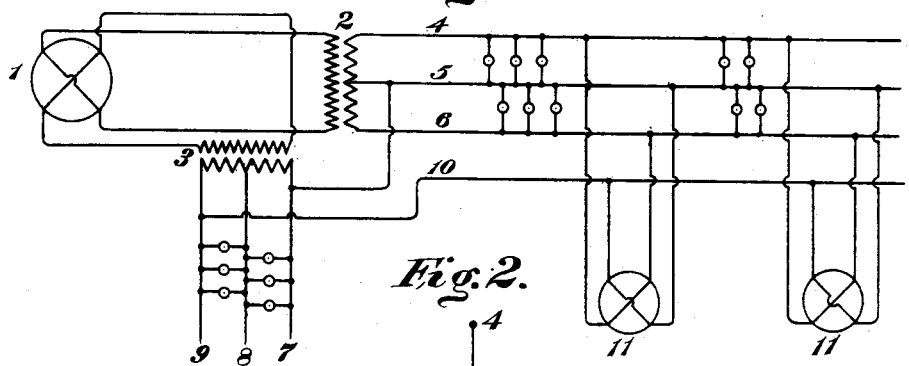
Figure 2:
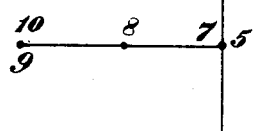
Figure 3:
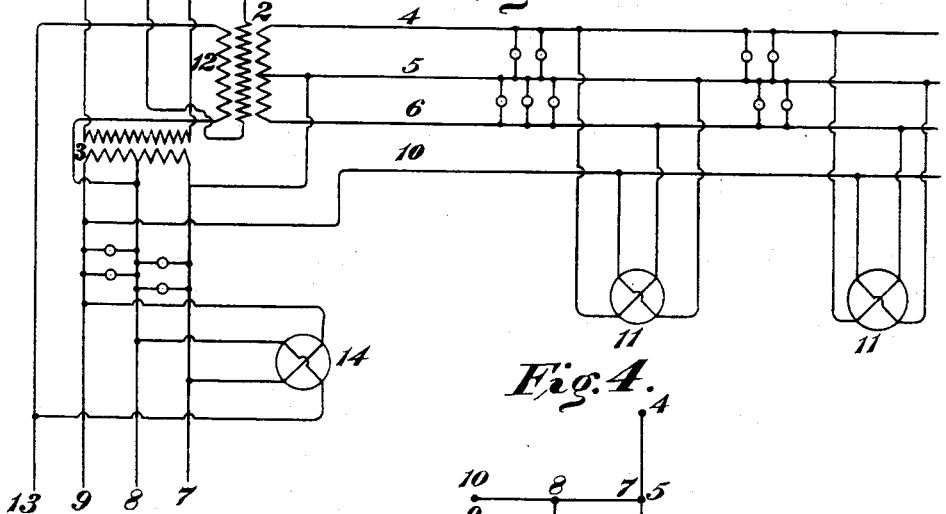
Figure 4:
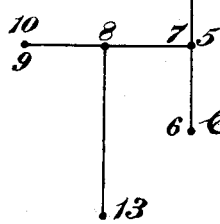

In the accompanying drawings, Figure 1 is a diagram of circuits illustrating one embodiment of my invention, and Fig. 2 is a diagram of the electromotive forces in the circuits represented in Fig. 1. Fig. 3 is a diagram similar to that shown in Fig. 1, but embodies an extension of the invention over that shown in Fig. 1. Fig. 4 is a diagram of the electromotive forces acting in the system illustrated in Fig. 3. Fig. 5 is a diagram similar to Fig. 1, illustrating a system in which the currents are supplied from the dynamo directly to the translating devices.

Referring now particularly to Figs. 1 and 2 of the drawings, 1 is a two-phase alternating-current generator which, as shown, supplies the primaries of two transformers 2 and 3 having the same ratio of transformation. If the voltage of the generator is suitable for transmission of current to the line directly and its armature is suitably wound for supplying three-wire circuits, the transformers may obviously be omitted. I have shown such a generator $1^a$ in Fig. 5 of the drawings. The secondary of transformer 2 (shown in Fig. 1) supplies a three-wire circuit 4 5 6, a middle or compensating conductor 5 being connected to the middle of such secondary. In the modification of the system illustrated in Fig. 5 one of the armature-windings of the generator supplies the three-wire circuit directly. The secondary of the transformer 3 or the second winding of the generator-armature, as the case may be, may supply a similar three-wire circuit 7 8 9, as shown, or if the energy from this transformer is not desired for the operation of translating devices supplied through such a circuit the conductors 7, 8, and 9 may be omitted.

It is well understood in the art that if the two sides of a three-wire circuit are equally loaded there will be no transfer of energy through the compensating wire or conductor and that the potential between this wire and each of the main or outer wires is one-half that between the two outer wires. As indicated in Fig. 1, the two circuits, which differ from each other in phase by ninety degrees, extend in different directions to supply different sets of translating devices. In case it is desired to utilize one of these circuits for the driving of one or more two-phase motors this may be done at comparatively small expense by running a fourth conductor 10 from one of the terminals of the secondary of transformer 3 and connecting the middle or compensating conductor 5 of the first circuit with the other terminal of transformer 3. Then the two main conductors 4 and 6 of the first circuit will supply current of one phase to the motors 11 and the middle wire 5, and the fourth wire 10 will supply current of the other phase to said motors. A brief examination of these circuits and the conditions controlling them will show that the potential between the middle wire 5 of the first circuit, when connected, as indicated in the drawings, to one of the terminals of transformer 3, and the fourth wire 10 of the first circuit, which is connected from the other terminal of transformer 3, will be the same as that between conductors 4 and 6 and that the current in circuit 5 to 10 is in quadrature with the current in circuit 4 to 6. (See Fig. 2.)

Referring now to Figs. 3 and 4 of the drawings, the two-phase generator 1 supplies the primary windings of the two transformers 2 and 3 with currents differing in phase, the same as in the form just described. The transformer 2 has a secondary which supplies a three-wire circuit 4 5 6 in the same manner as the form previously described, and the secondary of the transformer 3 also supplies a three-wire circuit 7 8 9. In this form the fourth wire 10, utilized for the purpose of operating two-phase motors 11, is connected to the main wire 9 of the second circuit, and the other main wire 7 of the second circuit is connected to the neutral wire 5 in the same manner. In order to utilize the second circuit also for the operation of two-phase motors, such as that indicated at 14, it becomes necessary, however, to employ a second secondary 12 for the transformer 2 or its equivalent, the terminals of such secondary being respectively connected to the fourth wire 13 of this second circuit and to the neutral or compensating wire 8 of such circuit. It being understood that the two transformers have the same ratio of transformation an analysis of the electromotive forces of this second circuit, connected and supplied as indicated, will show that the potential between the fourth wire 13 and the neutral wire 8 is equal to that between the two main wires 7 and 9 of the circuit and that the currents supplied will differ in phase by ninety degrees. (See Fig. 4.)

It will be understood as within my invention to provide either transformer with a second secondary, such as that shown at 12 in Fig. 3, and to connect the neutral and supplemental conductors of the other circuit to its respective terminals.

The arrangement of apparatus and circuits described is such as to permit of the utilization of existing single-phase three-wire circuits in the most economical and desirable manner for the operation of two-phase motors wherever such are desired.

I do not intend to limit my invention to any specific number of circuits or phases of current.

I claim as my invention—

1. A system of distribution for alternating currents comprising two circuits carrying currents differing in phase and each embodying two main conductors and a neutral or balancing conductor adapted to supply translating devices in multiple series, a fourth conductor for one of said circuits connected at one end to one of the main conductors of the other circuit and a connection between the other main conductor of the last-named circuit and the balancing-conductor of the four-wire circuit.

2. A system of distribution for alternating currents comprising two circuits supplied with currents from the secondaries of independent transformers and each having two main wires and a neutral or balancing wire, a fourth wire for one of said circuits connected at one end to one terminal of the transformer-secondary of the other circuit, a connection between the other terminal of the transformer-secondary of the last-named circuit and the middle point of the transformer-secondary that supplies the first circuit.

3. A system of distribution for alternating currents comprising two circuits carrying currents differing in phase and each embodying two main conductors and a neutral or balancing conductor adapted to supply translating devices in multiple series, a fourth conductor for one of said circuits connected at one end to one of the main conductors of the other circuit, a connection between the other main conductor of the last-named circuit and the neutral conductor of the four-wire circuit and a two-phase motor connected to the main conductors of the four-wire circuit for one phase and to the neutral wire and the fourth wire for the other phase.

4. A system of distribution for alternating currents comprising two circuits carrying currents differing in phase and each embodying two main conductors and a neutral or balancing conductor adapted to supply translating devices in multiple series, a fourth conductor for one of said circuits connected at one end to one of the main conductors of the other circuit, a connection between the other main conductor of the last-named circuit and the balancing-conductor of the four-wire circuit; single-phase translating devices connected between each of the main conductors and the balancing-conductor of each circuit and a two-phase motor connected to the main conductors of the four-wire circuit for one phase and to the balancing-conductor and the fourth wire for the other phase.

5. A system of distribution for alternating currents comprising two transformers supplying currents differing in phase, two three-wire circuits connected respectively to the secondaries of said transformers, a fourth wire for the first circuit connected to one terminal of the secondary of the second transformer, a connection between the other terminal of said secondary and the middle of the secondary of the first transformer, a second secondary for the first transformer, a fourth wire for the second circuit leading from one terminal of said secondary and a connection between the other terminal of said secondary and the middle of the secondary of the second transformer.

In testimony whereof I have hereunto subscribed my name this 20th day of October, A. D. 1897.

CHAS. F. SCOTT.

Witnesses:
WESLEY G. CARR,
HUBERT C. TENER.